United States Patent
Zanzucchi et al.

(10) Patent No.: US 7,384,343 B2
(45) Date of Patent: *Jun. 10, 2008

(54) METHOD AND IMAGER FOR DETERMINING THE POINT OF IMPACT ON A PUTTER FACE

(75) Inventors: Peter John Zanzucchi, Princeton Junction, NJ (US); Jonathan Bernstein, New York, NY (US)

(73) Assignee: Blue Marlin LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/357,216

(22) Filed: Feb. 21, 2006

(65) Prior Publication Data

US 2006/0189399 A1    Aug. 24, 2006

Related U.S. Application Data

(60) Provisional application No. 60/654,000, filed on Feb. 18, 2005.

(51) Int. Cl.
*A63B 69/36* (2006.01)

(52) U.S. Cl. .................. 473/156; 473/219; 473/223; 473/409

(58) Field of Classification Search ............... 473/219, 473/220, 221, 222, 151–153, 155, 156, 199; 434/252; 356/394; 273/108.2
See application file for complete search history.

(56) References Cited

U.S. PATENT DOCUMENTS

| | | | | |
|---|---|---|---|---|
| 5,342,054 A | * | 8/1994 | Chang et al. | 473/156 |
| 5,626,526 A | * | 5/1997 | Pao et al. | 473/156 |
| 5,846,139 A | * | 12/1998 | Bair et al. | 473/156 |
| 5,860,648 A | * | 1/1999 | Petermeier et al. | 273/108.2 |
| 6,302,802 B1 | * | 10/2001 | Pao | 473/156 |

* cited by examiner

*Primary Examiner*—Nini F. Legesse
(74) *Attorney, Agent, or Firm*—Bingham McCutchen LLP

(57) ABSTRACT

Imaging circuitry integrated into a golf club head, such as a putter, obtains an image from as the golf club head strikes a golf ball as well as successive images after the golf ball is struck, such n<5. The images can be analyzed by integral computational software provided in the imaging device operable to (i) analyze whether the ball was struck in the middle of the golf club head, (ii) whether the golf club head was square to the target and (iii) based on comparison of n successive images, calculate the immediate path of the golf ball.

2 Claims, 4 Drawing Sheets

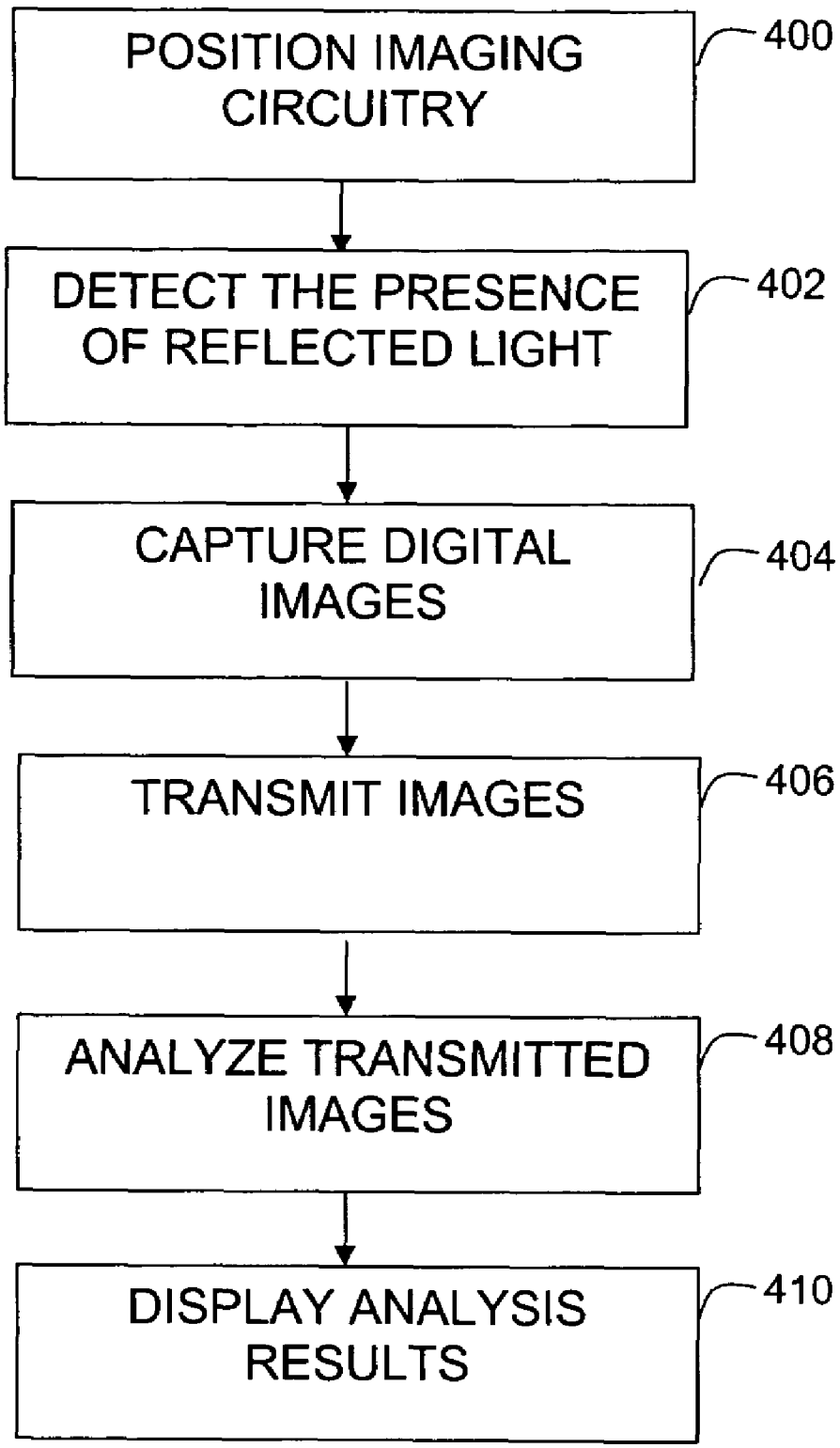

METHOD AND IMAGER FOR DETERMINING THE POINT OF IMPACT ON A PUTTER FACE

CROSS REFERENCE TO RELATED APPLICATIONS

The present invention claims priority to provisional Patent Application No. 60/654,000 filed Feb. 18, 2005, the entirety of which is incorporated herein by reference.

BACKGROUND OF THE INVENTION

1. Field of the Invention

The present invention relates to a method, a system and a computer program product for monitoring golf putting. More particularly, the present invention relates to a method, a device and a computer program product for determining golf putting characteristics while playing the game of golf.

2. Description of the Prior Art

The best chance for a golfer to sink a putt is to line the putt up properly and strike the ball in the middle of the putter face with the putter face square to the target line. Small deviations, such as not striking the ball in the center of the putter face, or slightly opening or closing the putter face results in the ball traveling off-line or traveling too short or too long a distance. A key to good golf is to learn to use the putter.

A variety of mechanical and optical technologies to improve putting, as well as driving, are available for the golfer. One technique utilizes a golf club that is designed with movable pins on the head of the club. By the displacement of the set of movable pins located on the head of the club a physical impression of the ball contact after a stroke is given and the properties of the contact such as primary position and uniformity are evident. However, The presence of the pins is invasive since they may affect the golf putting.

Optical technologies based on LED sensors and CCD or CMOS cameras have been employed for the purpose of teaching a golf stroke. For example, one technique implements IR cameras to record a golfer's swing which may be viewed and analyzed in playback. Another technique implements a dual camera for imaging golf club head movement prior to, at, and after impact of the golf club head. The speed, direction and orientation of the golf club may be determined by use of an integrated computer to analyze the images. Another technique implements a set of cameras that are triggered by motion of a golf ball and take images of the golf ball that can be used to measure the motion of a golf ball. Other techniques implement sensors that detect golf club path or golf club head speed, angle and contact positions to determine the speed, direction and orientation of the golf club.

Virtual reality technology is being employed in sports training systems to analyze the speed, direction and orientation of the golf club. In general these training systems employ a variety of cameras and rely on computer analysis of the image data that is presented in scenes of a virtual golf course to measure ball movement and to sense golf head properties. In general, the current technologies available rely on devices that require set-up and alignment and, as such, provide information on golf stroke characteristics separate from the actual playing of golf.

Accordingly, there is a need for a device to monitor golf stroke characteristics. There is a further need for the device to monitor golf stroke characteristics while playing the game of golf. There is a need for the device to be integrated into the putter for the purpose of monitoring the putting stroke while playing the game of golf. There is a need for the device to operate in a free standing mode and separate from the golf club.

SUMMARY OF THE INVENTION

According to embodiments of the present invention, a method, a device and a computer program product for monitoring golf putting characteristics while playing the game of golf are provided. The method obtains an image from an imaging device, such as the Scout™, integrated into the shank or shaft above a golf club head of a golf club, such as a putter, as the golf club head strikes a golf ball as well as successive images, such n<5.

The images can be analyzed by integral computational software provided in the imaging device operable to (i) analyze whether the ball was struck in the middle of the golf club head, (ii) whether the golf club head was square to the target and (iii) based on comparison of n successive images, calculate the immediate path of the golf ball. In practice, the desired immediate path is 90° to the face of the putter. Tabular or graphic data can be easily obtained to enable a golfer to assess his or her abilities, i.e., to learn putting skills, while actually playing the game of golf. The integration of this system onto a golf club eliminates the time required for set-up and alignment monitoring and thus the golfer may concentrate solely on the game of golf. The imaging device may be designed to be freestanding, independent of the golf club.

In an embodiment of the present invention, the imaging device is triggered at the moment the golf club head contacts the golf ball. Optical or electro-optical means offer selectivity in the detection of contact and are preferred. The smart camera, the optical or electrical connection to the trigger and the trigger device are as small as possible, such as 3 cm, so as not to distract the golfer and to have an appropriate field of view for the camera to obtain n successive images while retaining the image of the putter.

In an embodiment of the present invention, the imaging device is provided with edge detection software. The edge detection software calculates the center of the golf club head as the center of a rectangle while the golf ball is identified as a circle whose center moves on the green, i.e., on an (x,y) plane defined by the pixels of the images.

BRIEF DESCRIPTION OF THE DRAWINGS

The above described features and advantages of the present invention will be more fully appreciated with reference to the detailed description and appended figures in which:

FIG. 4 depicts an exemplary flow diagram for determining golf putting characteristics while playing the game of golf according to an embodiment of the present invention; and

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

According to embodiments of the present invention, a method, a device and a computer program product for monitoring golf putting characteristics while playing the game of golf are provided. The method obtains an image from an imaging device, such as the Scout™ integrated into a golf club head, such as a putter, as the golf club head strikes a golf ball as well as successive images, such n<5.

The images can be analyzed by integral computational software provided in the imaging device operable to (i) analyze whether the ball was struck in the middle of the golf club head, (ii) whether the golf club head was square to the target and (iii) based on comparison of n successive images, calculate the immediate path of the golf ball. In practice, the desired immediate path is 90° to the face of the putter. Tabular or graphic data can be easily obtained to enable a golfer to assess his or her abilities, i.e., to learn putting skills, while actually playing the game of golf. The integration of this system onto a golf club eliminates the time required for set-up and alignment monitoring and thus the golfer may concentrate solely on the game of golf. In an embodiment of the present invention, the imaging device may be designed to be freestanding, independent of the golf club.

Figure 1:
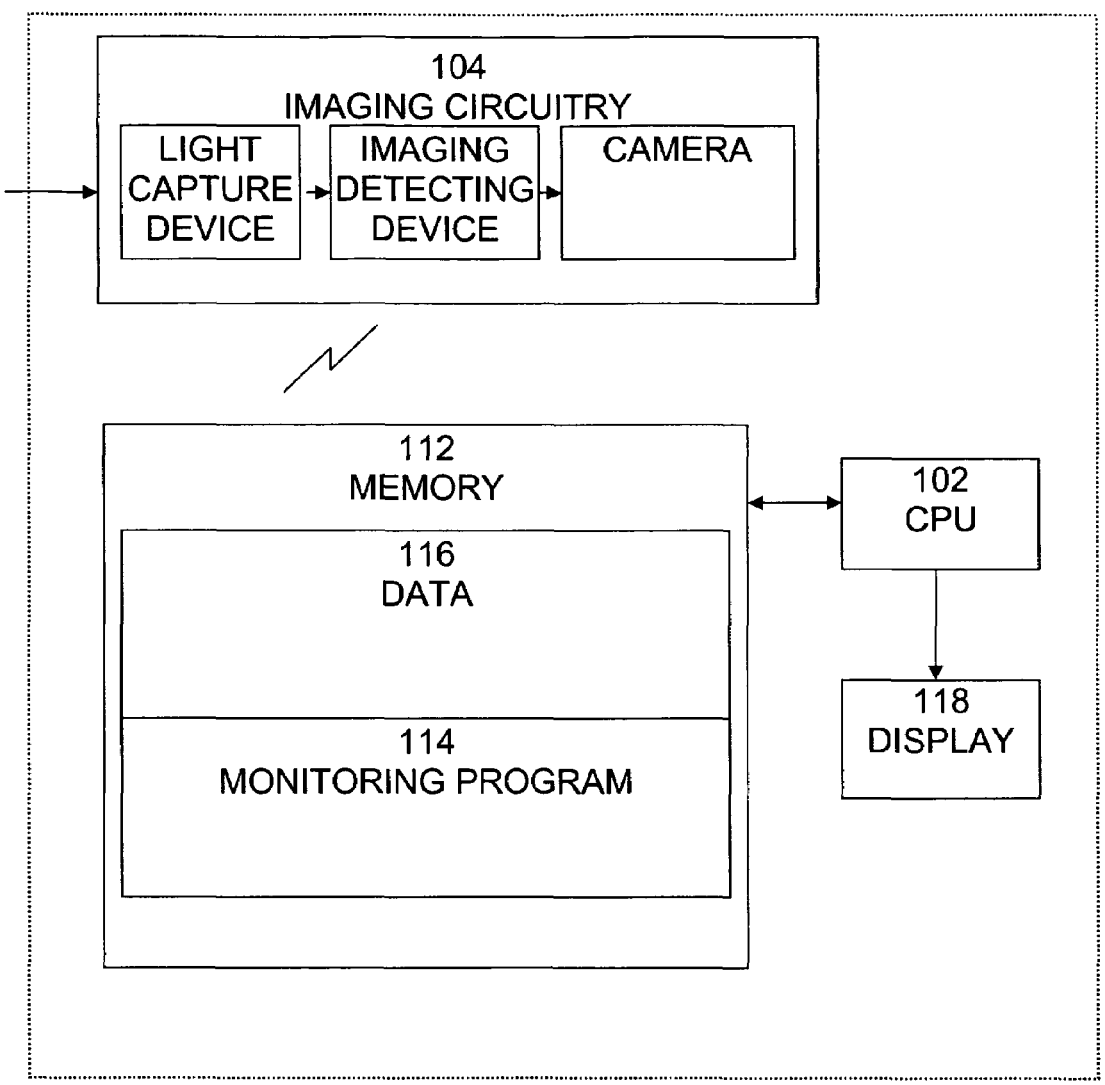
FIG. 1 depicts an exemplary functional block diagram of a device in which the present invention can find application.

FIG. 1 depicts a functional block diagram of an image taking device in which the present invention can find application. In the embodiment of FIG. 1, system 100 can be implemented to monitor golf putting characteristics while playing the game of golf. In the FIG. 1 embodiment, system 100 is a digital camera like the Scout™, but can be any apparatus that captures images and executes program instruction in accordance with the present invention. In an embodiment of the present invention, components of the system 100 are integrated into a golf club, such as the golf club head, shaft or shank. In an embodiment of the present invention, the system 100 is freestanding and independent of a golf club. In an embodiment of the present invention, the system is positioned at a fixed location, such as a position of the green of a hole on a golf course.

In the FIG. 1. embodiment of the present invention, the system 100 includes a processor (CPU) 102, imaging circuitry 106, memory 108, data 110, and display 112. In the FIG. 1 embodiment, imaging circuitry 106 includes, a light capture device, a light detecting device, and a camera. The imaging circuitry 106 detects the presence of light from an object, such as a golf ball, and upon detecting the presence of light from the object captures images of the object. The imaging circuitry must be sufficiently small and light weight so that its presence on a golf club will not affect the club performance. In an embodiment of the present invention, the imaging circuitry is 1 cm to 2 cm in size. In an embodiment of the present invention, the imaging circuitry is 2 cm to 3 cm in size. In an embodiment of the present invention, the imaging circuitry 106 is integrated into a golf club head of a golf club. In an embodiment of the present invention, the imaging circuitry 106 is integrated into the shank or shaft of a golf club above the club head of the golf club. In an embodiment of the present invention, the imaging circuitry 106 is integrated into system 100.

In the FIG. 1 embodiment of the present invention, the light capture device extends from the face of a golf club head, couples to the light detection device positioned above the golf club head, and captures the presence of light from an object. Light capture devices can include, but are not limited to, fiber optics and "light pipes." The light detecting device detects light captured from light capture device, couples to the camera, and generates a signal for camera to trigger and take images of the object. The light is captured just prior to the face of the golf club head contacting a golf ball. A lens of short focal length can focus objects for image capture. In the FIG. 1 embodiment of the present invention, the light detecting devices is a photodiode, but can be any device operable to detect light and provides an interface for acquiring object light. In the FIG. 1 embodiment of the present invention, the white pigments in golf balls, as well as the fluorescent whitening agents, such as Uvitex OB by Ciba Specialty Chemicals, Inc., widely used on golf balls provide for diffuse reflection of light or for blue fluorescence when golf balls are in the presence of sunlight that can be detected by light detecting device. Once light is sensed by the light detection device, an electrical signal is available to cause the camera to trigger.

In the FIG. 1 embodiment of the present invention, the camera receives a signal indicating that the presence of light from the object has been detected, generates images of the object in a digital code suitable for further digital signal processing by CPU 102 and provides the generated images of the object to memory 112. The CPU 102 is a microprocessor, such as an INTEL PENTIUM® or AMD® processor, but can be any processor that executes program instructions in order to carry out the functions of the present invention. In an embodiment of the present invention, the images generated by camera are provided by wirelessly transmitting the generated images using a transceiver.

In the FIG. 1 embodiment, the memory 112 is coupled to CPU 102 and stores monitoring program 114 and data 116. The data 116 includes, but is not limited to, images depicting the objects, coordinates of golf club head and coordinates of the object's immediate travel.

In the FIG. 1 embodiment, the monitoring program 114 provides the functionality associated with detecting the coordinates of golf club head and the coordinates of the object's immediate travel path as executed by the CPU 102. The monitoring program 114 is designed to report the coordinates of golf club head and the coordinates of the object's immediate travel path on a display 118.

Figure 2:
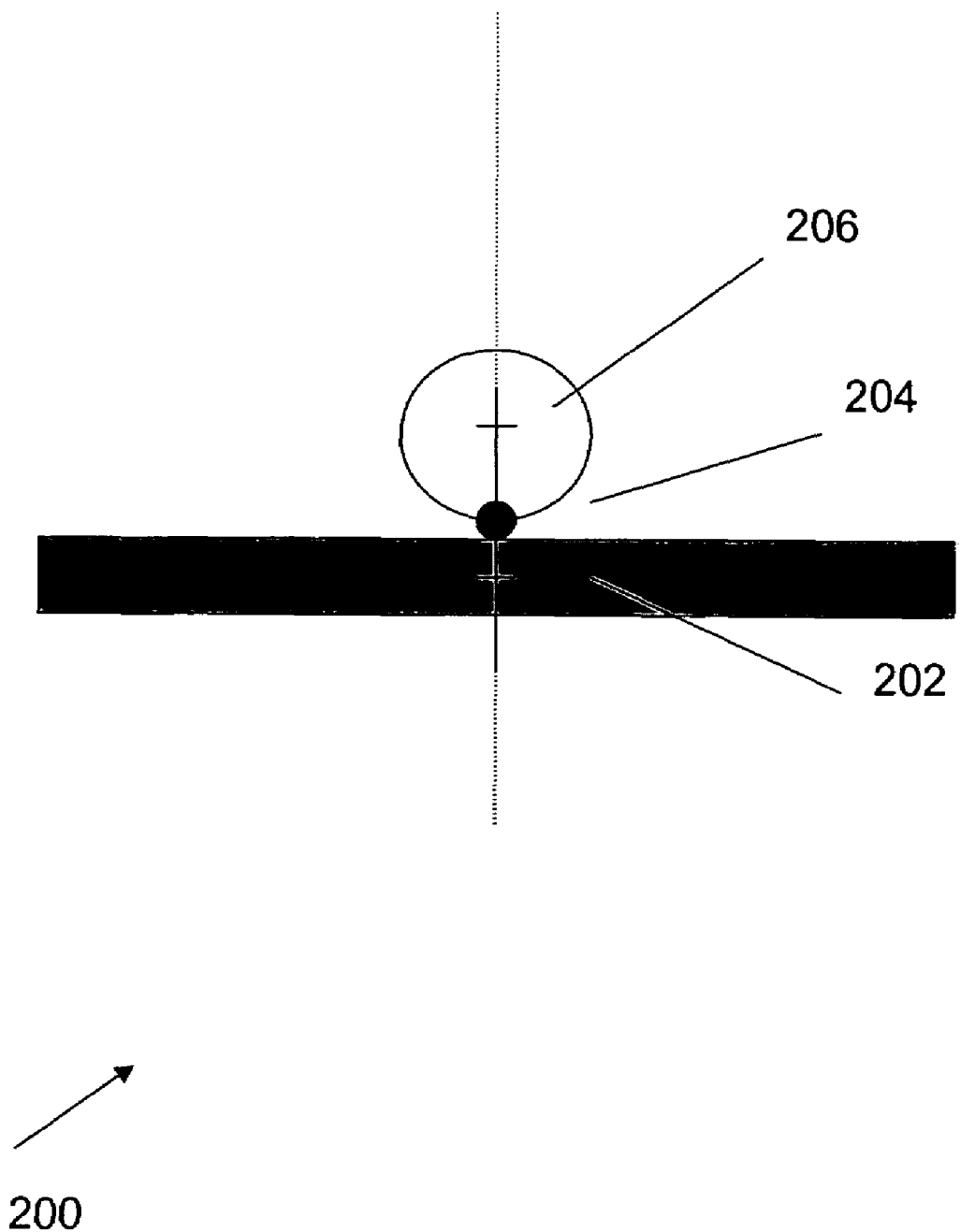
FIG. 2 depicts an exemplary diagram showing the placement of the imaging circuitry depicted in FIG. 1.

FIG. 2 depicts an exemplary schematic of the initial contact and trigger condition for the capture of diffused light from a golf ball. In FIG. 2 embodiment of the present invention, a putter face 202, the light capture device 204 and a golf ball 206 are shown. As shown, diffuse light from the golf ball is captured just prior to contact. The camera is activated by this in a relatively short time, such as between a microsecond and a -milliseconds. Short exposure times are necessary to avoid excessive blurring in the generation of the first image of the golf ball.

Figure 3:
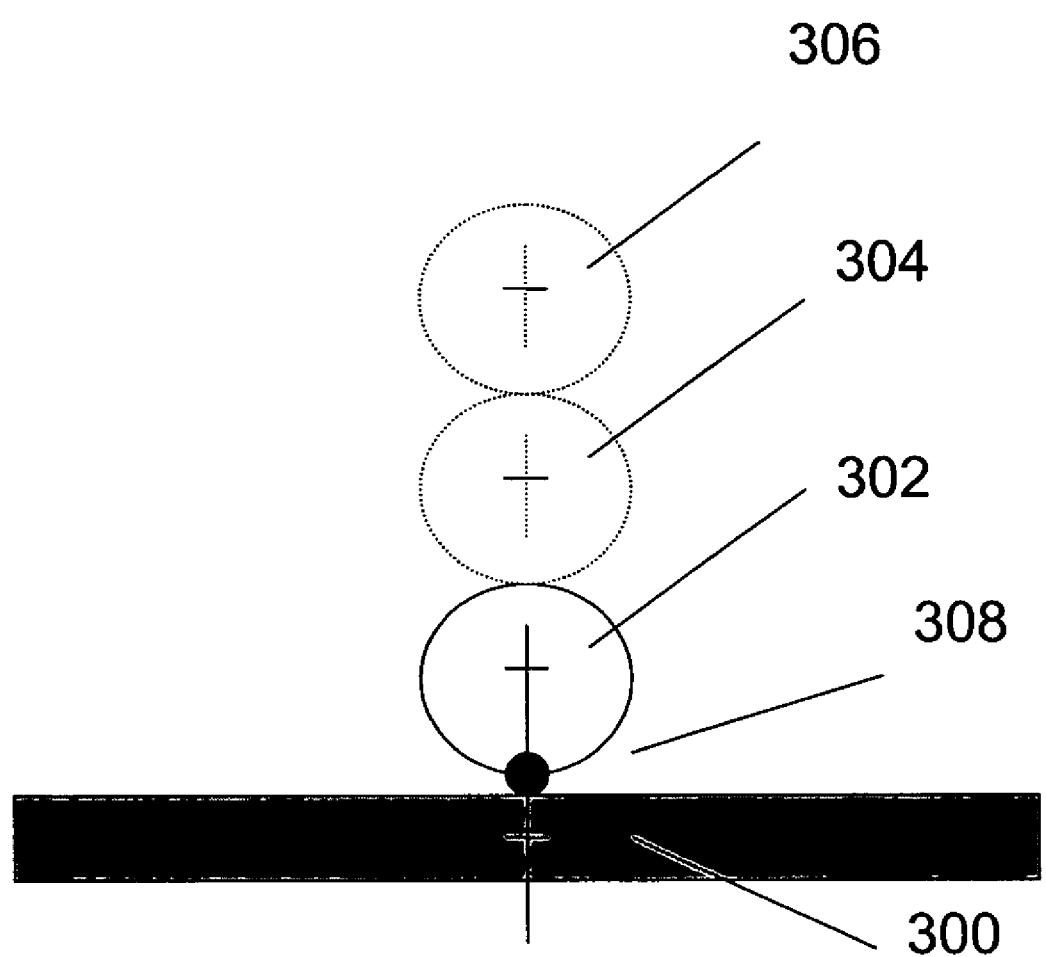
FIG. 3 depicts an exemplary representation of a golf ball taken in CCD images.

As shown in the FIG. 3 embodiment of the present invention, the critical (x,y) coordinates are the center of the putter 300, and the center of the golf ball 302. Once contact is detected, a series of CCD images are recorded, such as up to n=4. These successive images are of golf ball 302 at the initial time of contact and at times t1-tn, such as 304 and 306. The successive images can be used to determine a direction by identifying the line of the centers of the golf ball provided in each successive image. This data can be used to assess the quality of the putting. The principles to develop software to compute this data, in particular the center of the putter and of the golf ball, are well known and may be found in text books such as those by E. B. Davies, Machine Vision, Academic Press, which is hereby incorporated in its entirety.

FIG. 4 depicts an exemplary flow diagram for determining golf putting characteristics while playing the game of golf according to an embodiment of the present invention. The method begins at step 400. In step 400, imaging circuitry is positioned. In an embodiment of the present invention, the imaging circuitry is integrated into the shaft of a golf club. In an embodiment of the present invention, the imaging circuitry is positioned just above the club head of the golf club. In an embodiment of the present invention, imaging circuitry is place in a freestanding position proximate to the golf ball. In step 402, the light detection device of the imaging circuitry detect the presence of light reflected of a golf ball being putt. In step 404, a CCD camera of imaging circuitry captures successive images of the golf ball. In step 406, the successive images are transmitted to a memory. In step 408, the successive images are analyzed by a processor using a computer program as described herein to determine various characteristics of the putt. In an embodiment of the present invention, the analysis of the images generates data that can be used to determine any one of, or any combination of, whether the ball was struck in the middle of the golf club head, whether the golf club head was square to the target and based on comparison of n successive images, calculate the immediate path of the golf ball. In step 410, the results of the analysis are displayed.

While specific embodiments of the present invention have been illustrated and described, it will be understood by those having ordinary skill in the art that changes can be made to those embodiments without departing from the spirit and scope of the invention. For example, while the present invention concentrates on a single, it is understood that information from a series of images, a moving object or a specific object might advantageously be used as well. Also, while our application to golf balls has us discussing UV and visible light, the method is not dependent on this choice.

What we claim is:

1. A method of determining golf putting characteristics comprising positioning imaging circuitry;

detecting the presence of light reflected from a golf ball that is putt;

obtaining successive images of the golf ball once the presence of the reflected light from the golf ball is detected; and analyzing the successive images to determine at least one characteristic of the putt;

wherein the at least one characteristic is any one of: whether the ball was struck in the middle of the golf club head, whether the golf club head was square to the target and the immediate path of the golf ball.

2. The method according to claim 1, wherein the imaging circuitry is placed in a freestanding position.

* * * * *